US012612153B2

(12) United States Patent
Tabar et al.

(10) Patent No.: US 12,612,153 B2
(45) Date of Patent: Apr. 28, 2026

(54) TURBOPROP ERRONEOUS BLADE ANGLE READING ACCOMMODATION THROUGH MINIMUM TORQUE GOVERNING

(71) Applicant: Pratt & Whitney Canada Corp., Longueuil (CA)

(72) Inventors: Roja Tabar, Boucherville (CA); Louis Duranleau-Hendrickx, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 304 days.

(21) Appl. No.: 18/472,647

(22) Filed: Sep. 22, 2023

(65) Prior Publication Data

US 2025/0100675 A1     Mar. 27, 2025

(51) Int. Cl.
B64C 11/30        (2006.01)
G01B 21/22        (2006.01)

(52) U.S. Cl.
CPC ............ B64C 11/301 (2013.01); G01B 21/22 (2013.01)

(58) Field of Classification Search
CPC ... B64C 11/301; B64C 11/305; B64C 11/385; G01B 21/22; F02C 9/58
USPC ......................................... 73/1.75
See application file for complete search history.

(56) References Cited

U.S. PATENT DOCUMENTS 5,779,446 A     7/1998  Althof et al.
8,262,352 B2    9/2012  Gainford et al.

10,336,436 B2    7/2019   Siu et al.
10,864,979 B2   12/2020   Marone et al.
11,313,286 B2    4/2022   Chahal et al.
11,608,165 B2    3/2023   Eglin et al.
2010/0068056 A1*  3/2010   Gainford ................... F01D 7/00
                                                              416/61
2017/0248085 A1*  8/2017   Carrington .............. F02B 61/04
2020/0339244 A1* 10/2020   Tomescu .................. G01B 7/30
2021/0009252 A1*  1/2021   Forte ..................... B64C 11/305
2021/0009278 A1*  1/2021   Forte ...................... B64D 31/06
2022/0194555 A1*  6/2022   Krzywon ........... B64D 45/0005
2022/0243608 A1   8/2022   Krzywon
2022/0243610 A1   8/2022   Krzywon

OTHER PUBLICATIONS

Extended European Search Report for EP Application No. 24202010. 5, dated Jan. 7, 2025, pp. 1-11.

* cited by examiner

*Primary Examiner* — Marrit Eyassu
(74) *Attorney, Agent, or Firm* — CANTOR COLBURN LLP

(57)                ABSTRACT

An erroneous turboprop blade angle accommodation system includes a sensor configured to output a beta signal in response to adjusting a rotational pitch of a rotatable propeller blade, and a controller in signal communication with the sensor to receive the beta signal. The controller is configured to determine a beta angle of the rotatable propeller blade based on the beta signal and to control the rotational pitch based on an activated beta control logic. The controller is further configured to detect a beta error of the beta angle and to deactivate the beta control logic in response to detecting the beta error.

16 Claims, 5 Drawing Sheets

Linear Movement of Beta-Blade Converted from Rotational Propeller Blade Movement Rotational Movement of propeller blade

TURBOPROP ERRONEOUS BLADE ANGLE READING ACCOMMODATION THROUGH MINIMUM TORQUE GOVERNING

BACKGROUND

This disclosure relates to structures for use in gas turbine engines, and more particularly to a system and method for accommodating erroneous turboprop blade angle readings.

Aircraft engines can be designed with propeller blades capable of operating with a variable pitch, referred to as propeller blade angle or "beta". In such engines, accurate control of the beta angle is important for proper engine operation. For example, control of the beta angle may allow the blade angle to be controlled according to the desired engine power set-point. Accurate measure of the blade angle also ensures that the propeller is not inadvertently commanded to transition into disking or reverse beta angles, which would cause an undesirable operating condition for the aircraft. Various methods may be used to measure the blade angle. One such method involves the use of a beta-ring mounted for rotation with the propeller and moveable axially with adjustment of the blade angle.

BRIEF DESCRIPTION

According to a non-limiting embodiment, an erroneous turboprop blade angle accommodation system. The erroneous turboprop blade angle accommodation system includes a sensor configured to output a beta signal in response to adjusting a rotational pitch of a rotatable propeller blade, and a controller in signal communication with the sensor to receive the beta signal. The controller is configured to determine a beta angle of the rotatable propeller blade based on the beta signal and to control the rotational pitch based on an activated beta control logic. The controller is further configured to detect a beta error of the beta angle and to deactivate the beta control logic in response to detecting the beta error.

In addition to one or more of the features described above, or as an alternative to any of the foregoing embodiments, a beta ring is moveably coupled the propeller blade and is configured for linear motion in response to adjusting the rotational pitch. The sensor outputs the beta signal indicative of the linear motion in response to the linear motion.

In addition to one or more of the features described above, or as an alternative to any of the foregoing embodiments, the controller determines the rotational pitch based on the linear motion, and determines the beta angle based on the rotational pitch.

In addition to one or more of the features described above, or as an alternative to any of the foregoing embodiments, the sensor is a linear variable differential transformer (LVDT).

In addition to one or more of the features described above, or as an alternative to any of the foregoing embodiments, the sensor is an optical sensor.

In addition to one or more of the features described above, or as an alternative to any of the foregoing embodiments, the sensor is an eddy current proximity sensor.

In addition to one or more of the features described above, or as an alternative to any of the foregoing embodiments, the rotational pitch of the propeller blade is controlled by a minimum torque control scheme in response to deactivating the beta control logic.

In addition to one or more of the features described above, or as an alternative to any of the foregoing embodiments, the activated beta control logic utilizes a low engine speed control scheme to control the rotational pitch of the propeller blade.

In addition to one or more of the features described above, or as an alternative to any of the foregoing embodiments, the minimum torque control scheme maintains the beta angle above a minimum angle to maintain the propeller blade in a forward position.

In addition to one or more of the features described above, or as an alternative to any of the foregoing embodiments, the controller controls an engine that drives a propeller that supports the propeller blade.

In addition to one or more of the features described above, or as an alternative to any of the foregoing embodiments, the minimum torque control scheme maintains torque produced by the engine at a minimum torque that maintains the propeller blade in the forward position.

According to another non-limiting embodiment, a method of accommodating an erroneous turboprop blade angle is provided. The method comprises adjusting, by a controller, a rotational pitch of a rotatable propeller blade based on an activated beta control logic, and outputting, from a sensor, a beta signal in response to adjusting the rotational pitch of the rotatable propeller blade. The method further comprises determining, by a controller, a beta angle of the rotatable propeller blade based on the beta signal, and detecting, by the controller, a beta error of the beta angle, and deactivating the beta control logic in response to detecting the beta error.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
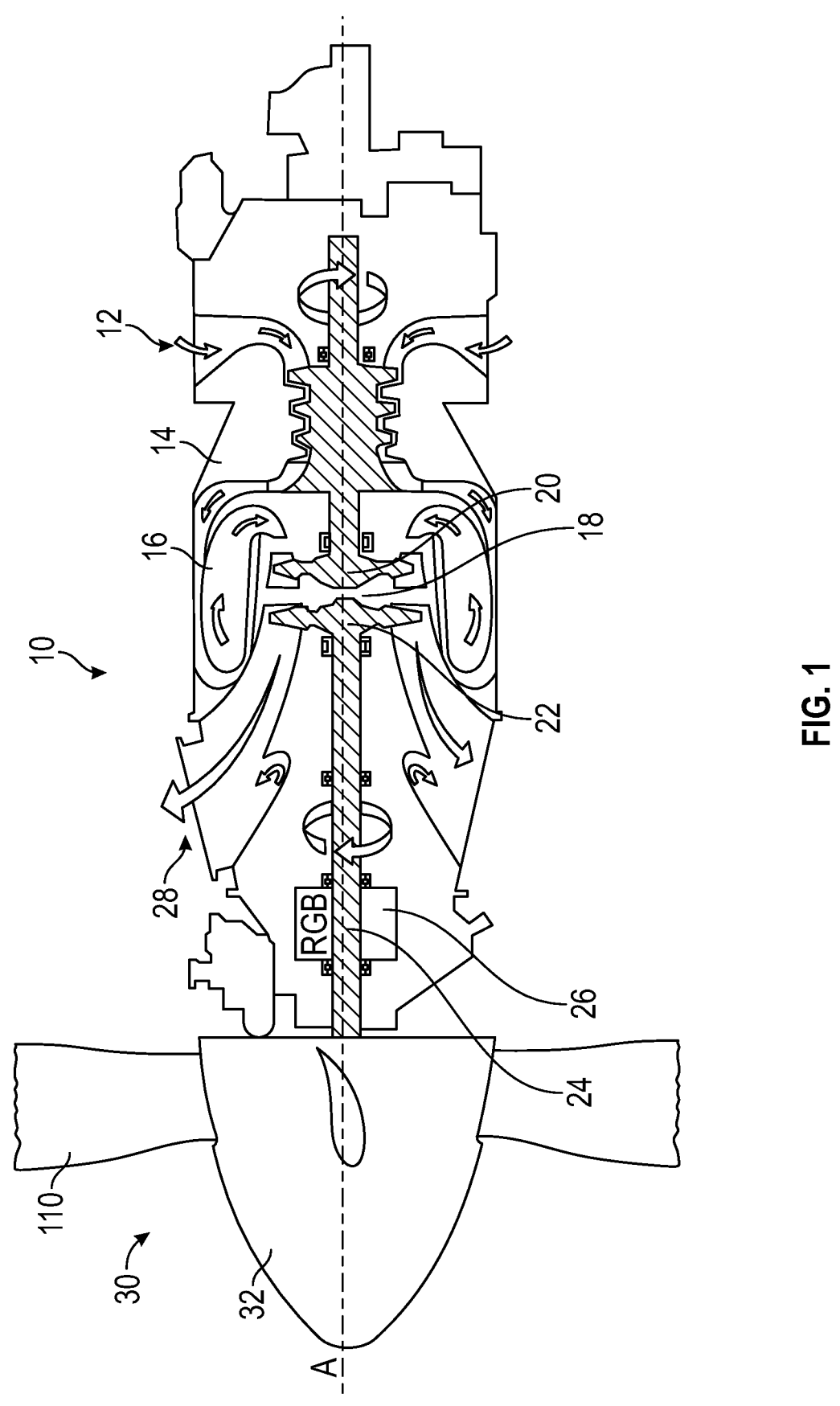
FIG. 1 is a schematic cross-sectional view of a gas turbine engine according to a non-limiting embodiment of the present disclosure.

A detailed description of one or more embodiments of the disclosed apparatus and method are presented herein by way of exemplification and not limitation with reference to the Figures describe below.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, propeller gas turbine aircraft engines can include a control of the propeller pitch (blade angle, also referred as the "beta angle" or simply the "beta" of the propeller). A beta-ring (often referred to as a 'beta-ring") can be mounted for rotation with the propeller and moveable axially with adjustment of the blade angle, and can be utilized to measure the beta angle. For example, the rotational motion of the propeller blades can be correlated into a linear motion of the beta-ring through a mechanical arrangement (e.g., scotch and yoke mechanism). The linear distance of the beta-ring can then be measured and converted, using the appropriate conversion factor/formula, in a geometric blade angle.

However, relying on the beta measurement of the propeller to achieve electronic propeller control may create issues because an erroneous measurement of the beta angle (referred to as beta error) could cause various control issues. For example, an erroneous beta angle measurement can cause unexpected engine handling behavior, discrepancies between a targeted propeller load/engine torque and the real or actual output(s), unintended propeller feathering, engine over-torque, and/or or inadvertent reverse propeller movement. Several reasons may cause an erroneous beta angle measurement such as, for example, an issue with the distance sensor, the presence of a foreign object that blocks the range of the distance measurement, and/or by a fault in the mechanical system that causes incorrect rotational motion-to-linear motion conversion.

An erroneous beta measurement angle can also introduce a fault in the control scheme intended to ensure the beta angle remains above a target angle (referred to as 'minimum beta') to prevent the propeller from inadvertently transitioning into reverse motion at low power. When reducing engine power, the minimum beta therefore stops the propeller to this minimum angle value and the propeller speed is reduced instead (to match the engine supplied power/torque).

The inventive teachings of the present disclosure address the short-comings caused by erroneous beta angle measurements by providing a system and method capable of accommodating a situation of an erroneous turboprop blade angle readings by deactivating beta control logics and using minimum torque control or a minimum torque governing loop. For example, the inventive teachings of the present disclosure provide a control system capable of preventing adverse engine effects when an erroneous beta measurement is detected by disengaging the minimum beta angle control that can be affected by erroneous beta measurements. Although a gas engine turboprop is described herein, it should be appreciated that the present inventive teaching can be applied to any engine with a controlled propeller angle (e.g., electric engine, hybrid-electric engine, Internal combustion engine etc.)

With reference now to FIG. 1, a gas turbine engine 10 is illustrated according to a non-limiting embodiment. The gas turbine engine includes an inlet 12, through which ambient air is directed, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatably drives a rotor shaft 24 about a longitudinal propeller shaft axis (A) through a reduction gear box 26. Hot gases may then be evacuated through exhaust stubs 28.

The engine 10 is coupled to a propeller 30. The propeller 30 includes a plurality of circumferentially-arranged blades 110 disposed on a hub 32 and which extend radially therefrom. Each of the blades 110 are rotatable about their own radial axes through a plurality of blade angles, which can be adjusted to achieve modes of operation, such as feather, full reverse, and forward thrust.

Figure 2:
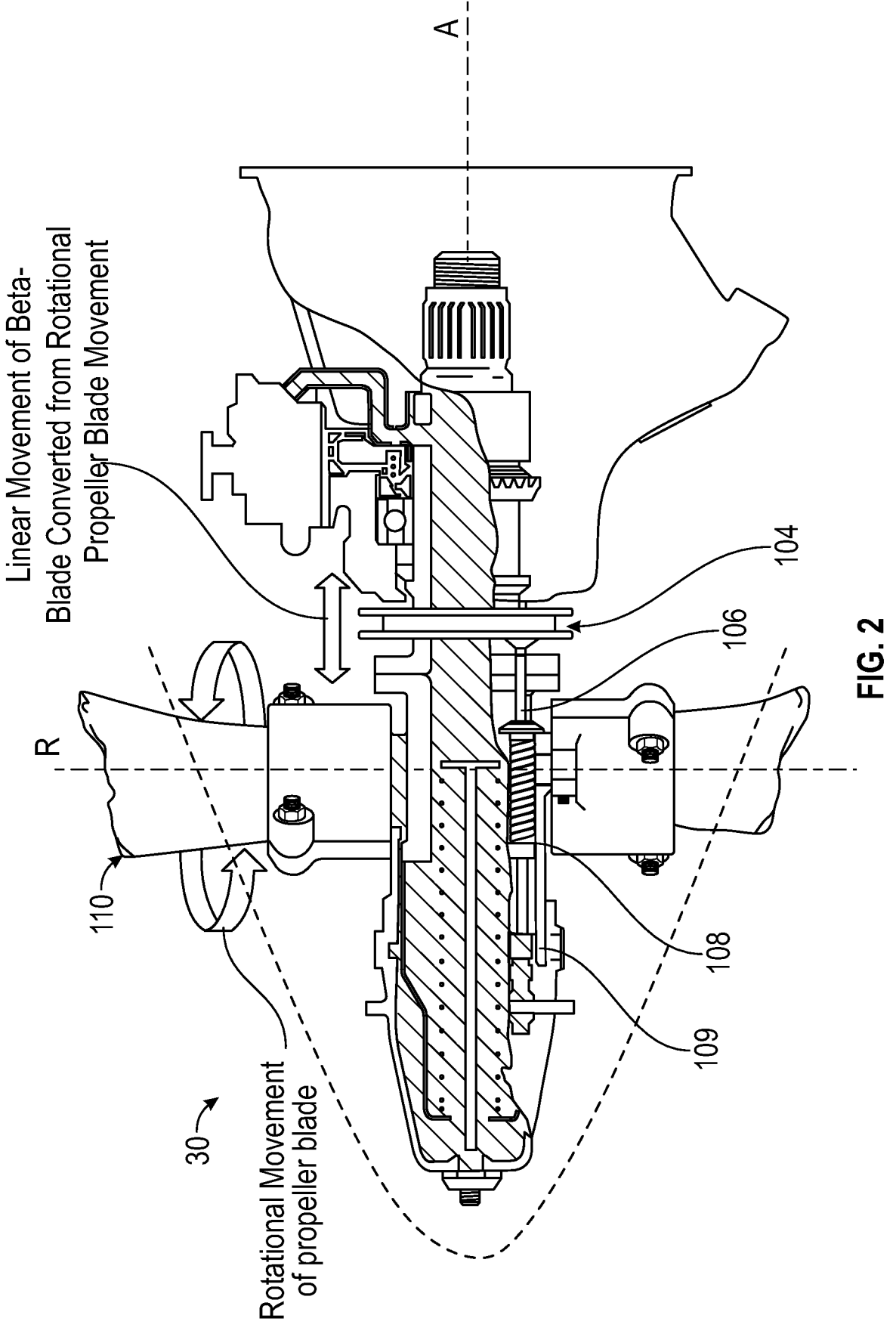
FIG. 2 is a schematic diagram of a propeller assembly comprising a beta-ring according to a non-limiting embodiment of the present disclosure.

As depicted in FIG. 2, for example, each blade 110 is rotatable about a radially-extending axis (R) through a plurality of adjustable blade angles. The blade angles are defined herein as the angle between the chord line (i.e., a line drawn between the leading and trailing edges of the blade 110) of the propeller blade section and a plane perpendicular to the axis of propeller rotation. Accordingly, the propeller 30 may be implemented as a "reversable propeller" 30 having a plurality of modes of operation, such as feather, full reverse, and forward thrust. The transition between forward mode and reverse mode is defined by the blade angle of attack (e.g. the angle between the chord line and the incoming airflow angle). In some modes of operations, such as feather, the blade angle is positive (e.g., positive angle of attack), also referred to as "forward mode". In some modes, however, the propeller 30 may be operated in a "reverse mode", where the blade angle is negative (e.g., negative angle of attack).

A beta-ring ring 104 is supported for rotation with the propeller 30, which rotates about the longitudinal axis (A). The beta-ring 104 is annular, for example, and may be referred to as a "feedback ring" or a "feedback beta-ring." The beta-ring 104 is also supported for longitudinal sliding movement along the longitudinal axis (A), e.g., by support members, such as a series of circumferentially spaced beta feedback rods 106 that extend along the longitudinal axis (A). A compression spring 108 surrounds an end portion of each rod 106. The beta-ring 104 is mounted in a manner that allows for it to be displaced along the longitudinal direction as the beta angle of the propeller blades 110 is adjusted. For example, adjustment of the beta angle causes a corresponding axial movement of the rods 106, and accordingly of the beta-ring 104, substantially parallel to axis (A). Conversely, adjustment of the beta angle in a first direction causes beta-ring 104 to move forwardly (e.g., towards the propeller 30), and adjustment of the beta angle in the opposite direction causes beta-ring 104 to move rearwardly (e.g., away from the propeller 30). In an example, the rods 106 and beta-ring 104 are moved to a maximally-forward position when blades 110 are at their smallest (or most negative) beta angle, and are moved to a maximally-rearward position when blades 110 are at their largest (or most positive) beta angle. As will be apparent, in other embodiments, this orientation may be reversed. The beta-ring 104 may be used to provide blade angle (i.e., beta) position feedback from an axial position of the beta-ring 104 along the axis (A).

Figure 3:
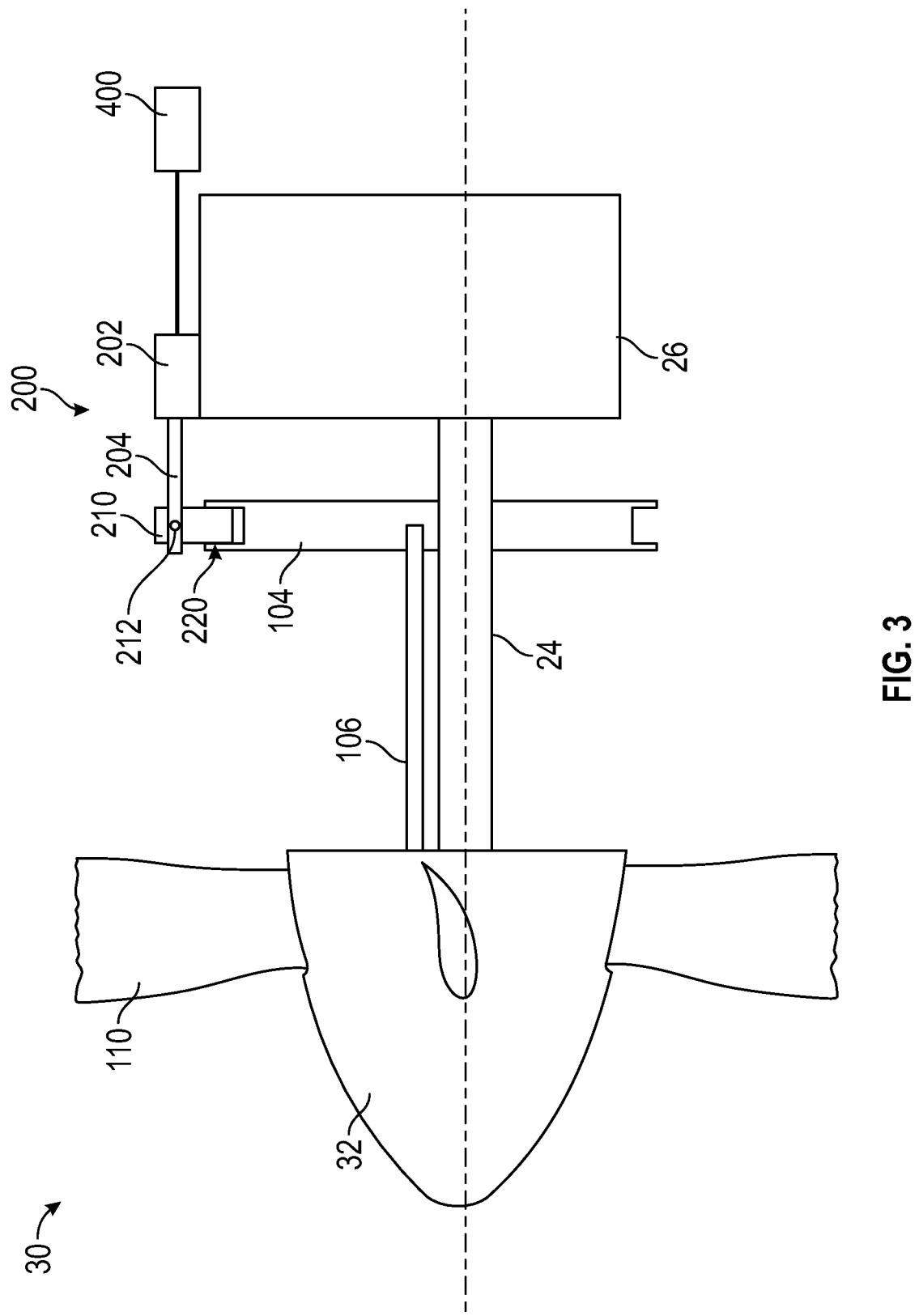
FIG. 3 is a schematic diagram of a propeller assembly including the beta-ring of FIG. 2 and a sensor configured to measure the position of the beta-ring according to a non-limiting embodiment of the present disclosure.

As depicted in FIG. 3, the propeller 30 can include a beta-sensor 200 in signal communication with a computing device 400. The beta-sensor 200 is configured to measure the axial position of the beta-ring 104. The beta-sensor 200 comprises a first member 202 and a second member 204 both extending along the longitudinal direction. The first member 202 is illustratively stationary and the second member 204 is displaceable along the longitudinal direction and moveable relative to the first member 202. The first member 202 is coupled to the engine (e.g., the gearbox 26) in any suitable manner. In the illustrated embodiment, the first member 202 is secured to the gear box 26; however, the first member 202 may be disposed at other locations of the engine without departing from the scope of present disclosure. The beta-sensor 200 is configured such that the second member 204 is movable relative to the first member 202 in the longitudinal direction as the beta-ring 104 moves along the longitudinal axis (A). For example, the first member 202 may comprise a tube and the second member 204 may comprise an arm (e.g., a rod, shaft, bar or like). The arm may be configured to be received in the tube and to be displaceable along the longitudinal direction, into and out of the tube, as the beta-ring 104 is displaced along the axis (A).

The beta-sensor 200 generates a signal that is indicative of a longitudinal position of the second member 204 relative to the first member 202. Accordingly, the signal may be indicative of a longitudinal displacement of the second member 204 relative to a reference position of the first member 202. The reference position may be an arbitrary reference position. When a position of the second member 204 is aligned with the arbitrary reference position of the first member 202, the signal generated by the beta-sensor 200 indicates no displacement. When the second member 204 is moved from the first position to a second position, in response to displacement of the beta-ring 104 along the longitudinal axis (A), the beta-sensor 200 generates a signal that is indicative of this second position and accordingly indicative of the displacement of the second member 204 relative to the reference position of the first member 202. It should be understood that the second member 204 may be axially displaced along the longitudinal direction so as to be positioned in a plurality of positions other than the first and second position.

The second member 204 is coupled to an engagement member 210, which is configured to engage the beta-ring 104. The second member 204 may be coupled to the engagement member 210 by any suitable mechanism. For example, in the illustrated embodiment, a fastener 212 is used to couple the second member 204 to the engagement member 210. The fastener 212 may be a pin, screw, bolt, or the like.

In some embodiments, the beta-sensor 200 is a linear variable differential transformer (LVDT). In some embodiments, the beta-sensor 200 can be implemented as an optical sensor. In other embodiments, the beta-sensor 200 can be implemented as an eddy current proximity sensor. The first member 202 may comprise three solenoidal coils (not shown) and the second member 204 may comprise a cylindrical ferromagnetic core (not shown). The three solenoidal coils may be placed around a tube. The core may be attached to an arm (e.g., a rod, shaft, bar or like) and the arm may be coupled to the engagement member 210. The three solenoidal coils comprise a center coil that is a primary coil, and two outer coils that are top and bottom secondary coils. The core is configured to slide along the axis (A) and may be configured to move in and out of the tube that the three solenoidal coils are wrapped around.

During operation, an alternating current drives the primary coil and causes a voltage to be induced in each secondary coil proportional to a length of the core linking to the secondary coils. As the core moves, the primary coil's linkage to the two secondary coils changes and causes an induced voltage to change. According this example, the signal generated by the beta-sensor 200 is an output voltage that is a difference between a top secondary voltage and a bottom secondary voltage. The output voltage varies depending on the position of the second member 204 relative to the first member 202. For example, the value of the output voltage may change linearly with an amount of change of the axial displacement of the second member 204 relative to the reference position of the first member 202. Accordingly, a given value of the output voltage may correspond to a given axial position of the beta-ring 104.

In accordance with an embodiment, the beta-ring 104 surrounds a channel 220 configured to retain the engagement member 210. In the illustrated embodiment, the channel 220 is u-shaped. However, the configuration of the channel 220 may vary depending on practical implementations. The engagement member 210 is a ring engagement member that is configured to move with the beta-ring 104 along the longitudinal axis (A) and when the beta-ring 104 rotates, the engagement member 210 remains retained in the channel 220. The engagement member 210 may be made of any suitable material(s). In some embodiments, the engagement member 210 is a block. In accordance with a specific and non-limiting example of implementation, the block is made of carbon.

The computing device 400 receives signals an output from the beta-sensor 200. The signals include, for example, the measurement signal indicating the measured axial position of the beta-ring 104. The computing device 400 may be referred to as a controller, which includes a processor and memory. In one or more non-limiting embodiments, the memory can store various look-up tables (LUTs), formulas and/or algorithms that convert measured linear movement of the beta-ring into a geometric blade angle. The memory can also store a method or algorithm, which when executed by the computing device 400, accommodates for erroneous turboprop blade angle readings using minimum torque governing loop controlled by a Proportional, Integral, Derivative (PID) controller, for example, as described herein.

According to a non-limiting embodiment, the computing device 400 is configured to determine the axial position of the beta-ring 104 along the longitudinal axis based on the sensor signal indicating the position of the second member 204 relative to the first member 202. For example, when the second member 204 is at the first position and aligned with the reference position of the first member 202 (i.e., no displacement of the second member 204 relative to the reference position of the first member 202), this corresponds to a first axial position of the beta-ring 104. When the second member 204 is at the second position, corresponding to a given displacement of the second member 204 relative to the reference position of the first member 202, this corresponds to a second axial position of the beta-ring. Accordingly, a relationship between a displacement of the second member 204 relative to the reference position of the first member 202 may be used to determine the axial position of the beta-ring. For example, a look-up table (LUT), a formula or an equation or the like (e.g., stored in the computing device 400) may be used to determine the axial position of the beta-ring from the displacement of the second member 204 relative to the reference position of the first member 202.

According to a non-limiting embodiment, the position of the beta-ring 104 may be determined based on known geometries of the engine and/or the various components described herein. For example, a position of the beta-sensor 200 relative to a propeller face datum position (e.g., a position defined by axis (R) in FIG. 2) may be used to provide a constant value (e.g., a distance between the propeller face datum position and the beta-sensor 200). The measured displacement of the second member 204 relative to the reference position of the first member 202 may be added to the constant value to determine the position of the beta-ring 104. In some embodiments, when there is a repeatable starting position of the beta-ring 104, relative movement may be used to determine the position of the beta-ring 104. A given axial position of the beta-ring corresponds to a given blade angle. Therefore, the blade angle can be determined from the axial position of the beta-ring 104 by the computing device 400.

In one or more non-limiting embodiments, the computing device 400 is configured to detect an erroneous beta measurement. In one embodiment, for example, the computing device 400 can determine an erroneous beta measurement by comparing the measured beta of one or more blades 110 to the resulting engine torque. The beta is correlated to the engine torque in that the engine is initially designed to produce an expected or target torque (Q) with respect to a given beta of the propeller blades 110. A LUT for example, can be generated which maps a multitude of betas to expected engine torque measurements. The LUT can then be stored in the computing device 400 and used to diagnose aircraft operation. Accordingly, the computing device 400 can compare a measured beta of one or more blades 110 to the resulting engine torque. When the actual engine torque does not match the target engine torque that is expected to be produced by the measured beta for the given ambient and operating conditions, the computing device 400 determines that the measured beta is erroneous. Although engine torque (Q) is used to determine an erroneous beta, it should be appreciated that other engine performance parameter such as power (e.g., torque*prop speed) may be used without departing from the scope of the present disclosure.

According to a non-limiting embodiment, the computing device 400 is configured to monitor the beta measurement signal output from the sensor and either activate or deactivate the beta control logic in response to determining the measured beta is erroneous. In this manner, minimum torque governing can be used to prevent the propeller 30 from inadvertently ending up in reverse at low power.

In terms of propeller operation, when reducing engine power, a minimum beta function can be used to adjust the propeller 30 to a minimum angle value. In turn, the propeller speed is reduced to match the engine supplied power/torque. However, this minimum beta function should not be used when the beta is erroneously measured as it may cause the propeller blades 110 to inadvertently transition into the reverse position. Accordingly, in response to detecting an erroneous beta measurement, the computing device 400 can deactivate the beta control logic and switch from the normal low power engine control to a minimum torque (Q) governing control loop. In one or more non-limiting embodiments, the normal low power engine control is determined by spool speed governing at fixed idle speed. It should be appreciated that other engine performance parameters such as a power (torque*prop speed) can be used without departing from the scope of the present disclosure.

Figure 4:
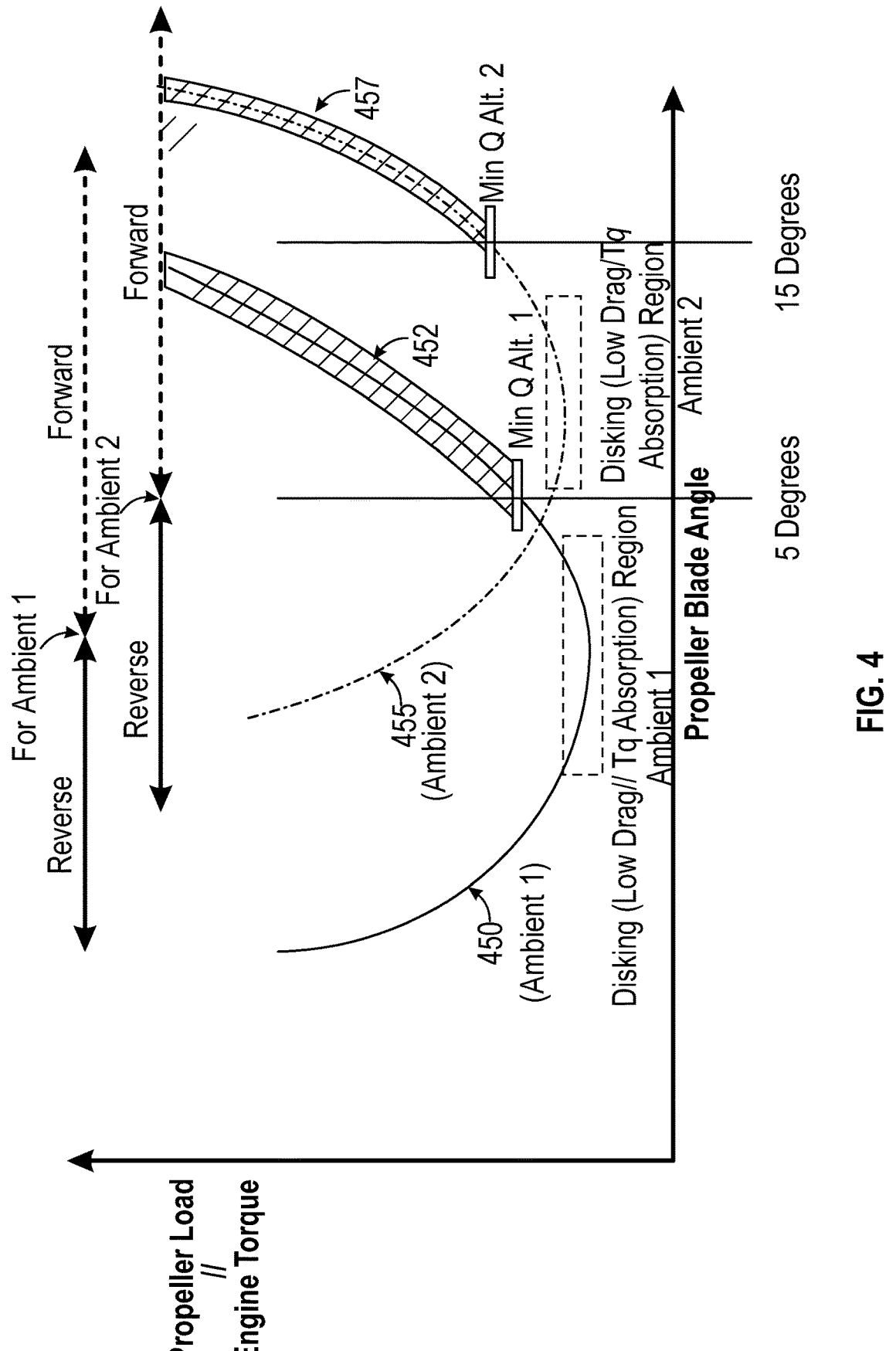
FIG. 4 is a graph illustrating the relationship of propeller load/engine torque versus propeller blade angle at different altitudes.

By maintaining a minimum engine torque, the same function as the minimum beta can be achieved, i.e., the propeller pitch would be limited from going towards reverse. FIG. 4, for example, depicts curve 450 and 455 illustrating the relationship of propeller load/engine torque versus propeller blade angle at different ambient conditions according to a non-limiting embodiment of the present disclosure. The ambient conditions include, but are not limited to, altitude, airspeed, and temperature. Since a propeller torque vs pitch angle goes through a minimum before transitioning into reverse (passing through a 'disking' low-torque phase). By maintaining a minimum torque (indicated by the shaded region 452 of the curve 450 and 457 of curve 455), the forward position of the propeller blades 110 can be maintained. Therefore, even without reading of the propeller beta, the minimum torque governing would keep the beta above the disking and reverse region by forcing it to absorb the minimum torque limit.

Generally, the aircraft and propeller 30 will operate over various conditions (e.g., propeller speed, airspeed, air density, altitude, etc.). According to one or more non-limiting embodiments, as operating conditions change, the curve 450 can be actively adjusted as indicated by curve 455. In this manner, the beta logic for controlling the position of the propeller blades 110 can be actively controlled (e.g., selective activated and deactivated) over multitudes of propeller load vs beta curves.

Figure 5:
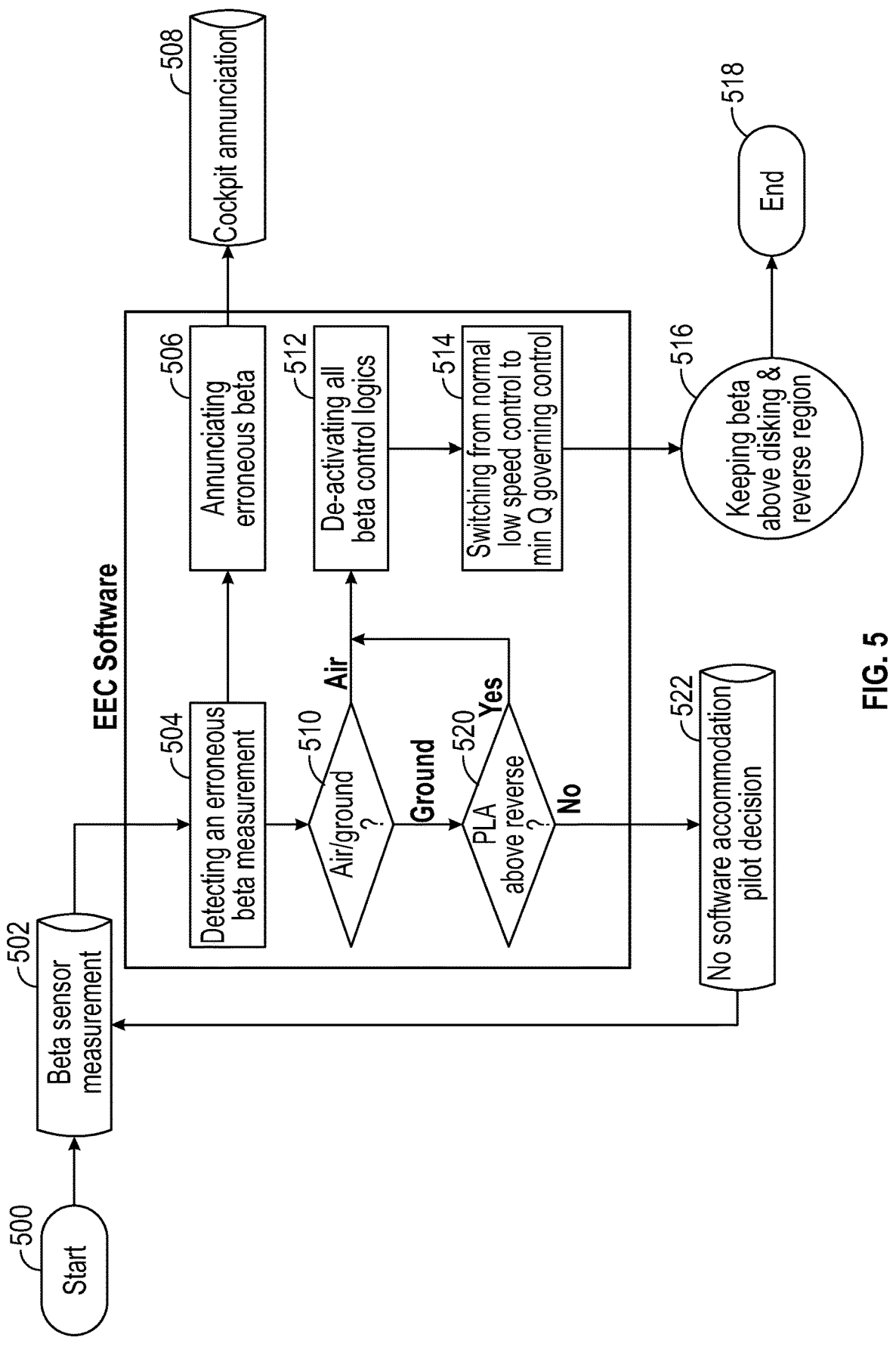
FIG. 5 is a flow diagram illustrating a method of accommodating erroneous turboprop blade angle readings using minimum torque control according to a non-limiting embodiment of the present disclosure.

Turning to FIG. 5, a method of accommodating erroneous turboprop blade angle readings using minimum torque control is illustrated according to a non-limiting embodiment of the present disclosure. The method begins at operation 500, and a beta sensor measurement is performed at operation 502. As described herein, the beta sensor measurement can include, for example, correlating a rotational motion of a propeller into a linear motion (e.g., linear distance) of the beta-ring, and converting the linear distance of the beta-ring into a geometric blade angle (beta) of the blade 110. At operation 504, a determination is made as to whether the measured beta is erroneous. According to one or more non-limiting embodiments, an erroneous beta measurement can be determined by comparing the measured beta of a blade to the resulting engine torque, and detecting an erroneous beta measurement occurred when the actual engine torque does not match the expected engine torque that corresponds to the measured beta. When the measured beta is not erroneous, the method returns to operation 500.

When, however, the measured beta is determined to be erroneous, the method proceeds to operation 506 to alert of the erroneous beta. In one or more non-limiting embodiments, the alert can include generating a cockpit alert at operation 508. The cockpit alert can include an announcement, or display indicator, for example, which alerts the cockpit crew of the erroneous beta and of the accommodation mode activation.

In response to determining the erroneous beta, an air/ground analysis is performed at operation 510 to determine whether the aircraft is presently located in the air or on the ground. Parameters such as altitude, speed, thrust, landing gear aircraft sensors, etc. can be used to determine air/ground status of the aircraft. When the aircraft is determined to be in the air, all beta control logic is de-activated at operation 512, and normal low speed control is switched to minimum toque (Q) governing control at operation 514. Accordingly, the beta is maintained above the disking region and the reverse blade region at operation 516 to prevent movement of the propeller pitch into the reverse position, and the method ends at operation 518. In a non-limiting embodiment, the minimum torque (Q) can a function of the ambient conditions or engine operation such as, for example, altitude, outside air temperature (OAT), airspeed, etc.

When the aircraft is determined to be on the ground at operation 510, a determination is made as to whether the power level angle (PLA) is above the reverse region at operation 520. When the PLA is above, the reverse region, operations 512 through 518 are performed as described above to prevent movement of the propeller pitch into the reverse position. The details of operations 512 through 518 are not repeated for the sake of brevity.

When, however, the PLA is not above the reverse region, the beta control logic is left activated at operation 522, and the method returns to operation 502 to continue measuring the beta. Accordingly, reverse thrust can be utilized while the aircraft is on the ground. In one or more non-limiting embodiments, a crew member (e.g., pilot or co-pilot) can manually de-activate the beta control logic at operation 522, and initiate operations 512 through 518 as described above to prevent movement of the propeller pitch into the reverse position. It should be appreciated that the sequence of the method described with respect to FIG. 5 is not limited thereto. For example, rather than ending at operation 518, method could establish a "self-healing" operation. For example, the computing device may reestablish the beta logic if it no longer detects an erroneous beta after a set amount of time.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An erroneous turboprop blade angle accommodation system comprising:
   a sensor configured to output a beta signal in response to adjusting a rotational pitch of a rotatable propeller blade; and
   a controller in signal communication with the sensor to receive the beta signal, the controller configured to determine a beta angle of the rotatable propeller blade based on the beta signal and to control the rotational pitch based on an activated beta control logic,
   wherein the controller is configured to detect a beta error of the beta angle and to deactivate the beta control logic in response to detecting the beta error,
   wherein the rotational pitch of the propeller blade is controlled by a minimum torque control scheme in response to deactivating the beta control logic, and
   wherein the controller controls an engine that drives a propeller that supports the propeller blade, and the minimum torque control scheme maintains torque produced by the engine at a minimum torque that maintains the propeller blade in the forward position.

2. The system of claim 1, further comprising a beta ring moveably coupled the propeller blade and configured for linear motion in response to adjusting the rotational pitch, wherein the sensor outputs the beta signal indicative of the linear motion in response to the linear motion.

3. The system of claim 2, wherein the controller determines the rotational pitch based on the linear motion, and determines the beta angle based on the rotational pitch.

4. The system of claim 1, wherein the sensor is a linear variable differential transformer (LVDT).

5. The system of claim 1, wherein the sensor is an optical sensor.

6. The system of claim 1, wherein the sensor is an eddy current proximity sensor.

7. The system of claim 1, wherein the activated beta control logic utilizes an engine speed control scheme to control the rotational pitch of the propeller blade.

8. The system of claim 7, wherein the minimum torque control scheme maintains the beta angle above a minimum angle to maintain the propeller blade in a forward position.

9. A method of accommodating an erroneous turboprop blade angle, the method comprising:
   adjusting, by a controller, a rotational pitch of a rotatable propeller blade based on an activated beta control logic;
   outputting, from a sensor, a beta signal in response to adjusting the rotational pitch of the rotatable propeller blade;
   determining, by a controller, a beta angle of the rotatable propeller blade based on the beta signal;
   detecting, by the controller, a beta error of the beta angle, and deactivating the beta control logic in response to detecting the beta error;
   using the controller to control an engine that drives a propeller that supports the propeller blade and to control, and to use a minimum torque control scheme to:
   control the rotational pitch of the propeller blade in response to deactivating the beta control logic; and
   maintain torque produced by the engine at a minimum torque which maintains the propeller blade in the forward position.

10. The method of claim 9, moveably coupling a beta ring to the propeller blade;
   adjusting the rotational pitch of the propeller blade to induce a linear motion of the beta ring;
   outputting from the sensor a beta signal indicative of the linear motion in response to the linear motion.

11. The method of claim 10, further comprising determining by the controller the rotational pitch based on the linear motion; and
   determining the beta angle based on the rotational pitch.

12. The method of claim 9, wherein the sensor is a linear variable differential transformer (LVDT).

13. The method of claim 9, wherein the sensor is an optical sensor.

14. The method of claim 9, wherein the sensor is an eddy current proximity sensor.

15. The method of claim 9, further comprising controlling the rotational pitch of the propeller blade using an engine speed control scheme when the beta control logic is activated.

16. The method of claim 15, further comprising using the minimum torque control scheme to maintain the beta angle above a minimum angle which maintains the propeller blade in a forward position.

\* \* \* \* \*